United States Patent
Yoon et al.

(10) Patent No.: US 7,680,272 B2
(45) Date of Patent: Mar. 16, 2010

(54) INVERSE CALCULATION CIRCUIT, INVERSE CALCULATION METHOD, AND STORAGE MEDIUM ENCODED WITH COMPUTER-READABLE COMPUTER PROGRAM CODE

(75) Inventors: Joong-chul Yoon, Seoul (KR); Sung-woo Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1250 days.

(21) Appl. No.: 11/021,351

(22) Filed: Dec. 23, 2004

(65) Prior Publication Data

US 2006/0126828 A1 Jun. 15, 2006

(30) Foreign Application Priority Data

Dec. 24, 2003 (KR) ...................... 10-2003-0096216

(51) Int. Cl.
*H04L 9/30* (2006.01)
(52) U.S. Cl. .............................. 380/30; 380/28; 708/250
(58) Field of Classification Search ............. 380/28–30, 380/46; 708/250, 255
See application file for complete search history.

(56) References Cited

U.S. PATENT DOCUMENTS

| | | | | |
|---|---|---|---|---|
| 4,989,171 | A | 1/1991 | Hollmann | 364/746.1 |
| 5,982,895 | A * | 11/1999 | Dworkin et al. | 380/271 |
| 6,038,581 | A | 3/2000 | Aoki et al. | 708/492 |
| 6,088,453 | A * | 7/2000 | Shimbo | 380/28 |
| 6,298,135 | B1 | 10/2001 | Messerges et al. | 380/1 |
| 6,795,553 | B1 * | 9/2004 | Kobayashi et al. | 380/28 |
| 6,850,960 | B2 * | 2/2005 | Aoki et al. | 708/270 |
| 7,050,579 | B1 * | 5/2006 | Koc et al. | 380/28 |
| 7,092,522 | B1 * | 8/2006 | Futa | 380/28 |
| 7,292,060 | B2 * | 11/2007 | Trichina et al. | 326/8 |
| 7,386,027 | B2 * | 6/2008 | Mo et al. | 375/130 |
| 7,421,074 | B2 * | 9/2008 | Jin et al. | 380/30 |
| 2001/0053220 | A1 * | 12/2001 | Kocher et al. | 380/29 |
| 2003/0185392 | A1 * | 10/2003 | Sun | 380/46 |

(Continued)

FOREIGN PATENT DOCUMENTS

EP 1239364 9/2002

(Continued)

OTHER PUBLICATIONS

Savas, et al.; "Architectures for Unified Field Inversion with Applications in Elliptic Curve Cryptography"; Electronics, Circuits and Systems; 2002; IEEE, vol. 3, Sep. 15, 2002, pp. 1155-1158.

(Continued)

*Primary Examiner*—Kimyen Vu
*Assistant Examiner*—Nirav Patel
(74) *Attorney, Agent, or Firm*—Mills & Onello, LLP

(57) ABSTRACT

In an inverse calculation circuit, an inverse calculation method, and a storage medium encoded with a computer readable computer program code, a random number generator generates a first random number and a second random number; and an inverter receives a plurality of first bits expressing a first element of a finite field(s) as first inputs, receives a plurality of second bits expressing a second element of a finite field(s) as second inputs. In response to the first and second random numbers, the inverter outputs a plurality of third bits expressing the inverse elements of the first element. The first random number prevents a different power analysis (DPA) decryption attack, and the second random number prevents a timing decryption attack.

15 Claims, 2 Drawing Sheets

U.S. PATENT DOCUMENTS

2004/0025032 A1 * 2/2004 Chow et al. .............. 713/189

FOREIGN PATENT DOCUMENTS

| JP | 11-52851 | 2/1999 |
| KR | 10-0202206 | 6/1999 |
| KR | 2002-0086005 | 11/2002 |
| KR | 2003-003435 | 1/2003 |

OTHER PUBLICATIONS

Akkar, et al.; "An Implementation of DES and AES, Secure Against Some Attacks"; Cryptographic Hardware and Embedded Systems, 2002, 9$^{th}$ International Conference, vol. 2162, pp. 309-318.

Kocher, Paul A., et al., "Introduction to Differential Power Analysis and Related Attacks," Cryptography Research, www.cryptography.com, 1998.

* cited by examiner

INVERSE CALCULATION CIRCUIT, INVERSE CALCULATION METHOD, AND STORAGE MEDIUM ENCODED WITH COMPUTER-READABLE COMPUTER PROGRAM CODE

This application claims the priority of Korean Patent Application No. 2003-96216, filed on Dec. 24, 2003, in the Korean Intellectual Property Office, the disclosure of which is incorporated herein in its entirety by reference.

BACKGROUND OF THE INVENTION

1. Field of the Invention

The present invention relates to a cryptography application circuit, and more particularly, to an inverse calculation circuit and inverse calculation method that is robust against a timing attack form of decryption and a differential power analysis (DPA) attack form of decryption, and a computer-readable non-transitory storage medium encoded with a computer-readable computer program code that implements the circuit or method.

2. Description of the Related Art

Cryptography was originally used in the defense and diplomatic fields to prevent compromise of national secrets. In the electronic age, financial institutions have long been using cryptography to manage electronic fund transfer. In addition, since the time when cryptography originally came into use in the economic and financial fields, it has been widely used for authentication of identification, encryption key management, digital signature, and identity verification.

Negligent management of decryption keys, predictability of passwords, or monitoring of keyboard inputs in communications networks may lead to a breach in security in the form of a decryption to an unauthorized person. Here, decryption indicates an activity in which an attempt is made to decrypt an encrypted text into a plaintext by determining a key that is originally used to encrypt the text when all information on the system such as the type of algorithm used for encrypting the plaintext and the operating system employed is known, but only the key used is unknown, as well as a method for attempting to decrypt an encrypted text into a plaintext only with the encrypted text (so called, "brute force" attack).

Common techniques for decryption include ciphertext-only attack, known plaintext attack, chosen plaintext attack, adaptively chosen plaintext attack, timing attack, and differential power analysis (DPA) attack.

The timing attack is a method in which it is determined whether the value of a predetermined bit is 0 or 1 using information related to the calculation time of an encryption algorithm, and based on the result, the encrypted text is decrypted. The DPA attack is a method in which according to the value of an input bit, the amount of power consumed by an encryption algorithm is analyzed, the bit values of a secret key are obtained, and then the encrypted text is decrypted. Various types of DPA attacks are summarized in "Introduction to Differential Power Analysis and Related Attacks", by Kocher, et al, Cryptography Research. Inc, San Francisco, Calif., 1998.

Elliptic curve cryptography defined in binary finite field $GF(2^n)$ can be broken down into a cryptography using affine coordinates and a cryptography using projective coordinates.

The affine coordinates express a coordinate on an elliptic curve as (x,y) and the projective coordinates express a coordinate on an elliptic curve as (X,Y,Z). Accordingly, the relationship between a point on an elliptic curve in the affine coordinates and a point on an elliptic curve in the projective coordinates is expressed in the following Equation 1:

$$x = \frac{X}{Z} \quad (1)$$

$$y = \frac{Y}{Z}$$

Among the type of calculations that can be performed on an elliptic curve are addition and doubling. Addition is used when two points being added are different, while doubling is used when two points being added are identical.

Calculation in the affine coordinates defined in a binary finite field $(GF(2^n))$ is expressed in the following Equation 2:

$$y^2 + xy = x^3 + ax^2 + b, \quad (2)$$

$$P_0 = (x_0, y_0), P_1 = (x_1, y_1),$$

$$\lambda = \frac{y_0 + y_1}{x_0 + x_1}, \text{ if } P_0 \neq P_1,$$

$$\lambda = x_1 + \frac{y_1}{x_1}, \text{ if } P_0 = P_1,$$

$$x_2 = a + \lambda^2 + \lambda + x_0 + x_1$$

$$y_2 = (x_1 + x_2)\lambda + x_2 + y_1$$

As shown in Equation 2, addition and doubling on an elliptic curve defined in a finite field $(GF(2^n))$ are formed by calculations (that is, addition, squaring, multiplication, and inverse calculation) of finite fields $(GF(2^n))$. The numbers and types of calculations required for performing addition and doubling calculations on each elliptic curve are provided in Table 1:

TABLE 1

| Types of calculations | Number of calculations |
|---|---|
| Point addition | 1I + 2M + 1S |
| Point doubling | 1I + 2M + 1S |

Here, I denotes the inverse calculation of finite field $(GF(2^n))$, M denotes the multiplication of finite field $(GF(2^n))$, and S denotes the squaring of finite field $(GF(2^n))$. Since addition of finite field $(GF(2^n))$ can be implemented by a bitwise XOR operation, the implementation of addition of finite field $(GF(2^n))$ and the speed of the addition operation can be neglected and therefore the addition operation of finite field $(GF(2^n))$ is not included in Table 1.

The inverse calculation of finite field $(GF(2^n))$ is an operation that takes greater part in elliptic curve encryption than those of finite field $(GF(2^n))$ multiplication and squaring. Accordingly, calculation in the projective coordinates that does not require inverse calculation is sometimes used for elliptic curve encryption. However, if addition and doubling on an elliptic curve using the affine coordinates become vulnerable to side channel attack, the stability of the elliptic curve encryption decreases.

SUMMARY OF THE INVENTION

The present invention provides an inverse calculation circuit robust against timing attack and differential power analysis (DPA) attack.

According to an aspect of the present invention, there is provided an inverse calculation circuit. The circuit comprises a random number generator which generates a first random number and a second random number. An inverter receives a plurality of first bits expressing a first element of a finite field as first inputs, and receives a plurality of second bits expressing a second element of the finite field as second inputs. In response to the first and second random numbers, a plurality of third bits expressing the inverse elements of the first element are output.

According to another aspect of the present invention, there is provided an inverse calculation method comprising: generating a first random number and a second random number; and receiving a plurality of first bits expressing a first element of a finite field as first inputs, receiving a plurality of second bits expressing a second element of the finite field as second inputs, and in response to the first and second random numbers, outputting a plurality of third bits expressing the inverse elements of the first element.

According to still another aspect of the present invention, there is provided a computer readable recording medium having embodied thereon a computer program that implements an inverse calculation method comprising: generating a first random number and a second random number; and receiving a plurality of first bits expressing a first element of a finite field as first inputs, receiving a plurality of second bits expressing a second element of the finite field as second inputs, and in response to the first and second random numbers, outputting a plurality of third bits expressing the inverse elements of the first element.

The first random number is generated at a time that is later than the time at which the second random number is generated. The first random number is formed with 2 bits, and the second random number is greater than 2n and less than 3n and n is the degree of the finite field. When the plurality of first bits and the plurality of third bits are formed with n bits, the plurality of second bits are formed with (n+1) bits.

The first random number prevents a differential power analysis (DPA) decryption attack, and the second random number prevents a timing decryption attack.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF PREFERRED EMBODIMENTS

Figure 1:
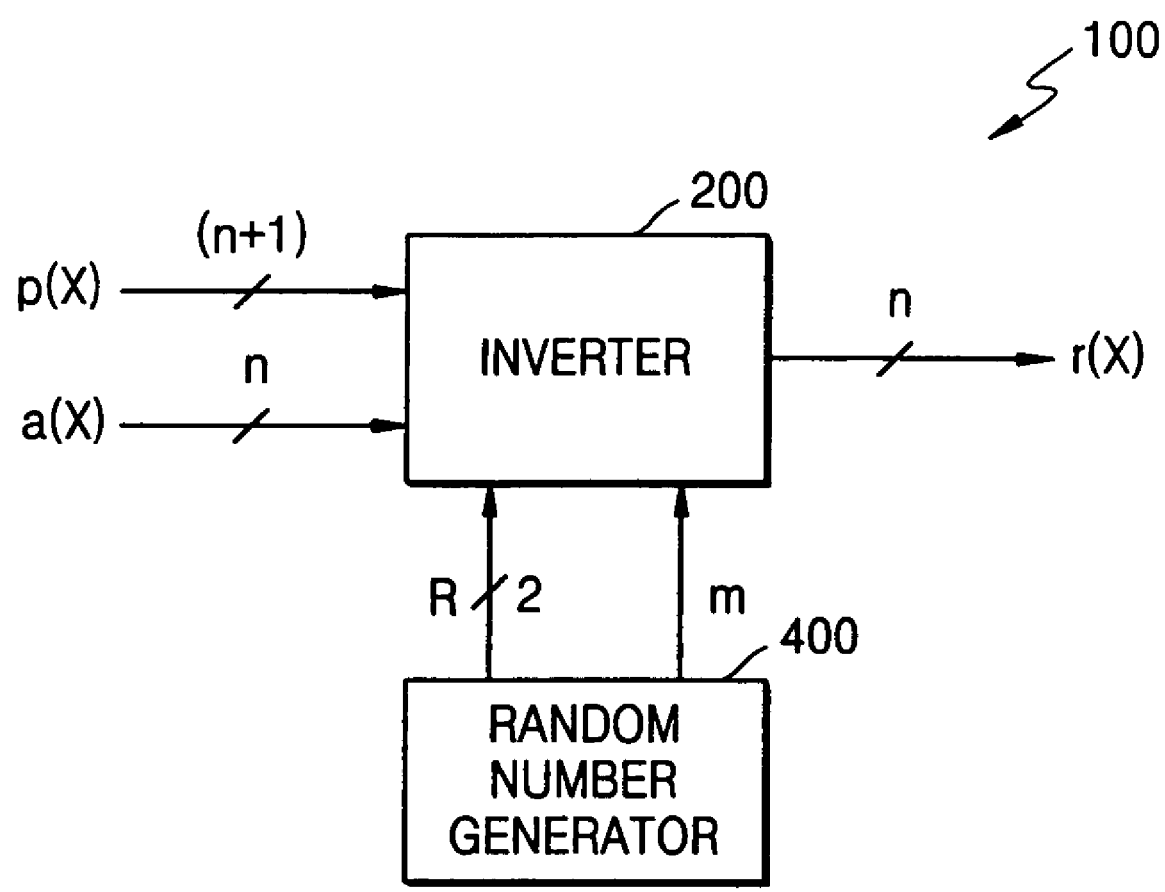
FIG. 1 is a block diagram of an inverse calculation circuit according to a preferred embodiment of the present invention.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. In the drawings, whenever the same element reappears in subsequent drawings, it is denoted by the same reference numeral.

A Montgomery inverse algorithm in a finite field (GF($2^n$)) is suggested by E. Savas, C. K. Koc in an article, "Architectures for unified field inversion with application in elliptic curve cryptography" in the 9th IEEE Internal Conference on Electronics, Circuit and System. The steps performed by the algorithm are as follows:

```
Input: a(x) and p(x), where deg(a(x)) < deg(p(x))
Output: r(x) and k, where r = a(x)⁻¹x^k (mod p(x))
and deg(a(x)) ≦k ≦deg(p(x)) + deg(a(x)) + 1
1:    u(x) := p(x), v(x):= a(x), r(x):= 0, and s(x):= 1
2:    k := 0
3:    while (v(x) != 0)
4:        if u(0) = 0 then u(x) := u(x)/x, s(x) := x·s(x)
5:        else if v(0) = 0 then v(x) := v(x)/x, r(x) := x·r(x)
6:        else if deg(u(x)) > deg(v(x)) then
              u(x) := (u(x) + v(x)) / x
              r(x) := r(x) + s(x)
              s(x) := xs(x)
7:        else v(x) := (v(x) + u(x)) / x
              s(x) := s(x) + r(x)
              r(x) := xr(x)
8:        k := k + 1
9:    if deg(r(x)) = deg(p(x)) then r(x) := r(x) + p(x)
10:   return r(x) and k
```

Here, a(x) denotes an element of finite field (GF(2n)), and an (n−1)-degree polynomial, and p(x) is an n-degree polynomial for modulus calculation. In addition, r(x) is the inverse element of a(x) and is an (n−1)-degree polynomial. The degree (deg(a(x))) of a(x) is less than the degree (deg(p(x))) of p(x). The Montgomery inverse algorithm calculates $a(x)^{-1}x^k$ in relation to element a(x) of finite field (GF($2^n$)). At this time, the condition for k is:

$$\deg(a(x)) \leq k \leq \deg(p(x)) + \deg(a(x)) + 1$$

That is, when n is the degree of finite field (GF($2^n$)), k≦2n.

In the Montgomery inverse algorithm, the calculation time required for the inverse calculation and k vary with respect to element a(x) of finite field (GF($2^n$)). However, when element a(x) of identical finite field (GF($2^n$)) is repeatedly input to an inverse calculation circuit that implements the Montgomery inverse algorithm, the calculation time for calculating the inverse element of element a(x) is identical. Accordingly, the inverse calculation circuit is vulnerable to the timing attack form of decryption.

An improved Montgomery algorithm (hereinafter referred to as 'First Montgomery inverse algorithm) has improved the conventional Montgomery algorithm to make the algorithm robust against timing attack. The steps of the first Montgomery inverse algorithm are as follows:

```
1.      Input a(x) and p(x), where deg(a(x)) < deg(p(x))
2.      u(x)← p(x), v(x)← a(x), r(x)← 0, and s(x)← 1
3.      m← random value, 2n ≦m ≦3n
4.      while (k < m)
4.1         if (v(x) ≠0)
4.1.1           if(u₀ ≠0) u(x)←u(x)/x, s(x)←x·s(x)
4.1.2           else if (v0 ≠0) v(x)←v(x)/x, r(x)←x·r(x)
4.1.3           else if (deg(u(x)) > deg(v(x))) then
                    u(x)← (u(x) + v(x))/x
                    r(x)← r(x) + s(x)
                    s(x)←x·s(x)
4.1.4           else v(x)← (v(x) + u(x))/x
                    s(x)← s(x) + r(x)
                    r(x)← x·r(x)
4.2         else
4.2.1           if (rₙ = 1) r(x)← r(x) + p(x)
4.2.2           r(x)← x·r(x)
4.3         k← k + 1
```

-continued

| 5. | if (deg(r(x)) = deg(p(x))) r(x) ← r(x) + p(x) |
| 6. | OUTPUT r(x), k |

The first Montgomery inverse algorithm, as well as hardware implementing such an algorithm, introduces random number m into the Montgomery inverse algorithm. The range of random numbers (m) is between 2n and 3n and the random number is an arbitrary number within the range. Here, n denotes the degree of the finite field (G F($2^n$)).

The Montgomery inverse algorithm performs inverse calculation only during the time when (v(x)≠0). In contrast, the first Montgomery inverse algorithm performs step 4.1 when (v(x)≠0), but if v(x) is 0, the first Montgomery inverse algorithm performs step 4.2.

Accordingly, step 4.2 performs inverse calculation until k is equal to the random number (m) defined in step 4, such that in the first Montgomery inverse algorithm, the time for calculating the inverse element for the input varies even for an identical input (for example, an element of finite field (GF($2^n$)) whose inverse elements are desired to obtain). Therefore, the first Montgomery inverse algorithm is more robust against decryption in the form of a timing attack.

At this time, in the Montgomery inverse algorithm, k of $a(x)^{-1}x^k$ is a number less than 2n and in the first Montgomery inverse algorithm, k of $a(x)^{-1}x^m$ is a number less than 3n.

Since in the first Montgomery inverse algorithm, step 4.2 is performed only after step 4.1 has completed. the relationship between $a(x)^{-1}x^k$ and $a(x)^{-1}x^m$ is:

$$a(x)^{-1}x^m = a(x)^{-1}x^k x^{(m-k)}$$

Accordingly, the first Montgomery inverse algorithm always performs step 4.1 before v(x) becomes 0. For this reason, the first Montgomery inverse algorithm is vulnerable to DPA attack.

In an approach according to the present invention, referred to herein as a "second Montgomery inverse algorithm" the first Montgomery inverse algorithm is improved upon such that it is robust against both timing attack and DPA attack. The second Montgomery inverse algorithm of the present invention operates in one embodiment as follows:

| 1. | Input a(x) and p(x), where deg(a(x)) < deg(p(x)) |
| 2. | u(x) ← p(x), v(x) ← a(x), r(x) ← 0, and s(x) ← 1 |
| 3. | m ← random value, 2n ≦ m ≦ 3n |
| 4. | while (k < m or v(x) ≠ 0) |
| 4.1 | R ← random value, 0 ≦ R ≦ 3 |
| 4.2 | if (v(x) ≠ 0 and R ≠ 0) |
| 4.2.1 | if($u_0$ ≠ 0) u(x) ← u(x)/x, s(x) ← x·s(x) |
| 4.2.2 | else if (v0 ≠ 0) v(x) ← v(x)/x, r(x) ← x·r(x) |
| 4.2.3 | else if (deg(u(x)) > deg(v(x))) then |
| | u(x) ← (u(x) + v(x))/x |
| | r(x) ← r(x) + s(x) |
| | s(x) ← x·s(x) |
| 4.2.4 | else v(x) ← (v(x) + u(x))/x |
| | s(x) ← s(x) + r(x) |
| | r(x) ← x·r(x) |
| 4.3 | else |
| 4.3.1 | if ($r_n$ = 1) r(x) ← r(x) + p(x) |
| 4.3.2 | r(x) ← x·r(x) |
| 4.3.3 | if ($s_n$ = 1) s(x) ← s(x) + p(x) |
| 4.3.4 | s(x) ← x·s(x) |
| 4.4 | k ← k + 1 |
| 5. | if (deg(r(x)) = deg(p(x))) r(x) ← r(x) + p(x) |
| 6. | OUTPUT r(x), k |

The second Montgomery inverse algorithm according to the present invention introduces random number (R). Random number (R) has an arbitrary integer value between 0 and 3 in each iteration. When v(x) is not equal to 0 and the random number R is not equal to 0, step 4.2 is performed.

Also, when v(x) is not 0 and R is 0, step 4.3 is performed. Accordingly, the second Montgomery inverse algorithm according to the present invention does not perform an identical operation for an identical input. Since random number (R) has an arbitrary value between 0 and 3, and since step 4.3 is performed only when v(x) is not 0 and R is 0, the probability that step 4.3 is performed is ¼. If random number (R) is chosen to have a random value of 0 or 1, the steps 4.2 and 4.3 are performed with an equal probability of ½. By incorporating the random value R into the process, step 4.3 of the process is arbitrarily performed, causing the power curve to vary each time an input value is processed. Thus, even in cases where the input value is the same, a different power curve profile will be generated. In this manner, an attack based on the relationship between the input value and the power curve is thwarted The inverse calculation circuit according to the present invention implements the second Montgomery inverse algorithm and will now be explained in detail with reference to FIGS. 1 and 2.

FIG. 1 is a block diagram of an inverse calculation circuit according to a preferred embodiment of the present invention.

Referring to FIG. 1, the inverse calculation circuit 100 comprises an inverter 200 and a random number generator 400.

The random number generator 400 generates first random number (R) and second random number (m). The first random number (R) is operable to prevent the DPA attack form of decryption. Since, in this example, the range of the first random number (R) generated by the random number generator 400 according to the present invention is from 0 to 3, the value of the first random number (R) can be expressed by 2 bits. However, the range of the first random number (R) according to the present invention is not limited to 0 from 3, and therefore may comprise a fewer or greater number of bits.

The second random number (m) is operable to prevent the timing form of decryption. In one embodiment, the second random number (m) is greater than 2n and less than 3n. Here, n denotes the degree of finite field (GF($2^n$)). In one embodiment, the first random number is generated at a time that is later than the time at which the second random number is generated.

The inverter 200 receives a(x) and p(x) and in response to the first and second random numbers (R) and (m), outputs r(x). Here, a(x) denotes an element of finite field (GF($2^n$)) whose inverse elements are desired to obtain. a(x) is an (n−1)-degree polynomial and expressed by n bits.

p(x) is an n-degree polynomial for modulus calculation and is expressed by (n+1) bits. r(x) denotes an inverse element and is an (n−1)-degree polynomial and is expressed by n bits.

Figure 2:
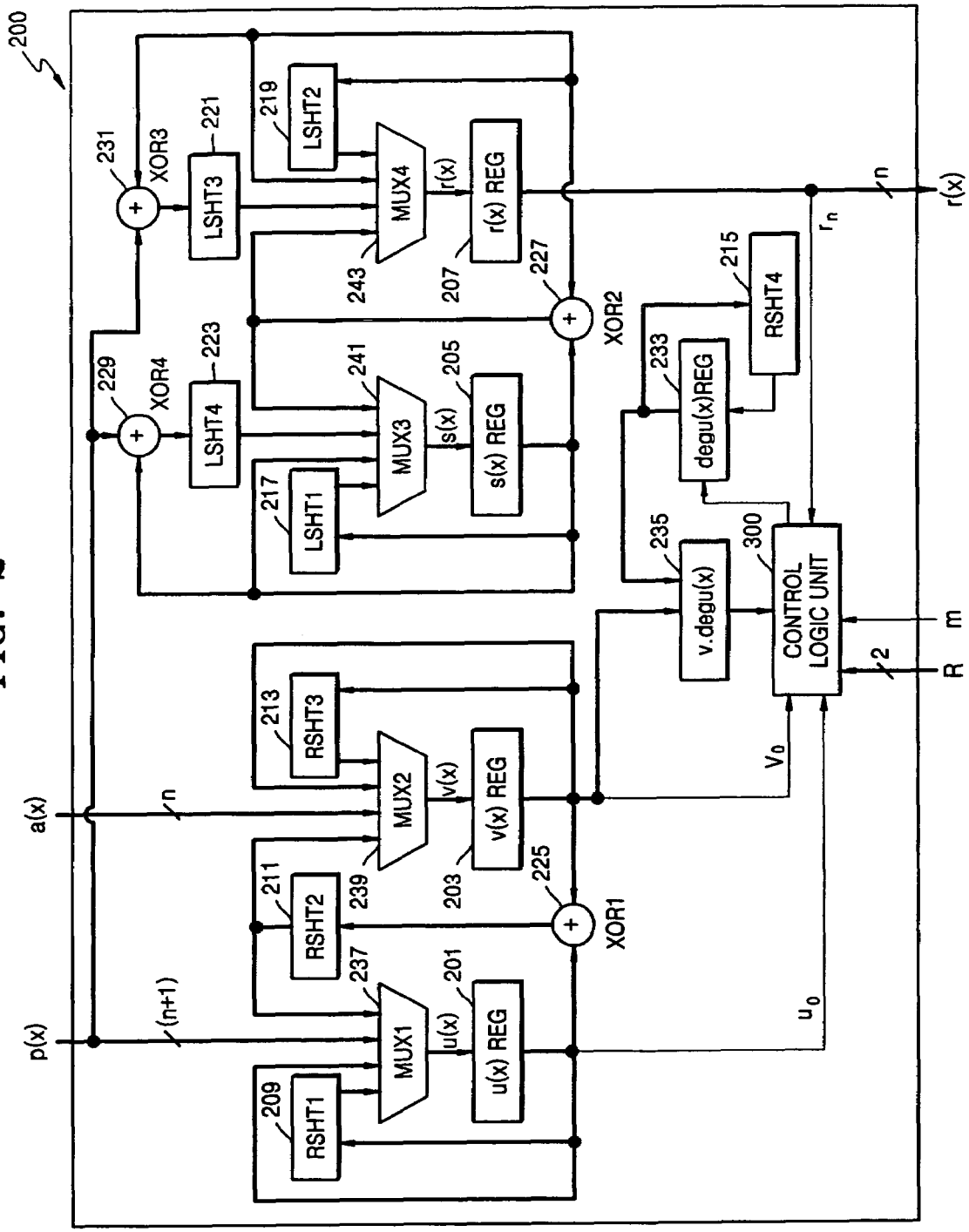
FIG. 2 is a circuit diagram of an inverter shown in FIG. 1.

FIG. 2 is a circuit diagram of the inverter 200 shown in FIG. 1. The structure and operation of the inverter 200 will now be explained in detail with reference to FIGS. 1 and 2, and with reference to the second Montgomery inverse algorithm.

Registers 201, 203, 205, and 207 store u(x), v(x), s(x), and r(x), respectively.

Right shift registers 209, 211, and 213 each receive respective input data, shift the data one bit to the right, and store a 0 in respective most significant bits (MSBs). For example, in the case where data output from the register 201 is 00011, the right shift register 209 receives 00011 and outputs 00001.

The right shift register 215 receives input data, shifts the data one bit the right, and stores a 1 in the MSB. Accordingly, if data output from the register 233 is 11000, the right shift register 215 receives 11000 and outputs 11100.

Left shift registers 217, 219, 221, and 223 receive respective input data, shift the data to the left hand side by 1 bit, and store 0 in respective least significant bits (LSBs).

Each of XOR gates 225, 227, 231, and 229 performs a bitwise XOR operation between two input data. For example, XOR gate 225 performs a bitwise XOR operation between data output from the register 201 and data output from the register 203.

The register 233 operates to store the degree of finite field (GF($2^n$)), and is set to 1000 . . . 0 in the initial stage. Assuming that u(x) is finite field (GF($2^n$)) and degu(s) is (deg$U_n$, deg $U_{n-1}$, . . . , deg$U_1$, deg$U_0$), then deg$U_n$=1, and deg $U_{n-1}$=deg$U_1$=deg$U_0$=0.

AND circuit 235 receives data outputs from the registers 203 and 233, and performs a bitwise AND operation between them.

A control logic unit 300 generates control signals based on least significant bit LSB($u_0$) of the register 201, least significant bit LSB($v_0$) of the register 203, most significant bit MSB($r_n$) of the register 207, and the output signal of the AND circuit 235.

Each of the control signals are input to a corresponding unit among the multiplexers 237, 239, 241, and 243, and the registers 201, 203, 205, and 207. The registers 201, 203, 205, and 207 update stored data in response to respective control signals.

The inverter 200 of FIG. 2 implements the second Montgomery inverse algorithm and respective steps and corresponding circuits will now be explained.

Step 4.2.1 is implemented by the register 209 and the multiplexer 237, and the register 217 and the multiplexer 241. Step 4.2.2 is implemented by the register 213 and the multiplexer 239, and the register 219 and the multiplexer 243.

In step 4.2.3, u(x)←(u(x)+v(x))/x is implemented by the XOR gate (XOR1) 225, the right shift register (RSHT2) 211 and the multiplexer (MUX1) 237, r(x)←r(x)+s(x) is implemented by the XOR gate (XOR2) 227 and the multiplexer (MUX1) 243, and s(x)←x·s(x) is implemented by the left shift register 217 and the multiplexer (MUX3) 241.

In step 4.2.4, v(x)←(v(x)+u(x))/x is implemented by the XOR gate (XOR1) 225, the right shift register 211, and the multiplexer (MUX2) 239, s(x)←s(x)+r(x) is implemented by the XOR gate (XOR2) 227 and the multiplexer (MUX3) 241, and r(x)←x·r(x) is implemented by the left shift register 219 and the multiplexer (MUX4) 243.

Steps 4.3.1 and 4.3.2 are implemented by the XOR gate (XOR3) 231, the left shift register 219, the left shift register 221, and the multiplexer (MUX4) 243.

Steps 4.3.3 and 4.3.4 are implemented by the left shift registers 217 and 223, and the multiplexer (MUX3) 241.

In step 4.2.3, deg(u(x))>deg(v(x)) is implemented by the register 233 and the AND circuit 235 as the following.

When a calculation begins, data stored in the register 233 is 100 . . . 0. Whenever u(x)←(u(x)+v(x))/x of step 4.2.1 or step 4.2.3 is performed and data stored in the register 201 is updated, the degree of u(x) decreases.

Whenever the degree decreases, the register 233 receives and stores data output from the register 215. At this time, if the degree of u(x) is greater than the degree of v(x), data to be stored in the AND circuit 235 is 000 . . . 0.

For example, assuming that in finite field (GF($2^4$)), data stored in the register 233 in the initial stage is (10000) and v(x) is (00111), the degree of v(x) is 2.

If the step 4.2.1 is performed and the data stored in the register 201 is updated, the degree of u(x) is 3. At this time, data of the register 233 is (11000). If an AND operation is performed by the AND circuit 235, the result is (00000). In this case, the degree of u(x) is 3, and the degree of v(x) is 2.

If the step 4.2.1 is again performed, the degree of u(x) becomes 2, and (11100) is stored in the register 233. At this time, (00100) is stored in the AND circuit 235. The control logic unit 300 performs the step 4.2.4 by using stored information.

The inverse calculation circuit according to the present invention can be applied to any of a number of apparatus that employ encryption technology, such as a smart card, or other forms of storage media.

As described above, the inverse calculation circuit, the inverse calculation method, and the non-transitory storage medium encoded with a computer readable computer program code according to the present invention are robust against both the timing attack form of decryption and the DPA attack form of decryption.

While the present invention has been particularly shown and described with reference to exemplary embodiments thereof, it will be understood by those of ordinary skill in the art that various changes in form and detail may be made herein without departing from the spirit and scope of the present invention as defined by the following claims.

What is claimed is:

1. An inverse calculation circuit included in a cryptography application circuit for elliptic curve cryptography using finite fields, the inverse calculation circuit comprising:

a random number generator which generates a first random number and a second random number; and an inverter that receives a plurality of first bits expressing a first element of a finite field as first inputs, wherein the first element is a (n−1)-degree polynomial, and that receives a plurality of second bits expressing a second element of the finite field as second inputs, wherein the second element is a n-degree polynomial and, in response to the first random number and the second random number, outputs a plurality of third bits expressing an inverse element of the first element, wherein the inverse element is a (n−1)-degree polynomial, wherein the inverter comprises:
a first register;
a second register;
a third register;
a fourth register;
a first right shift register shifting output data of the first register one bit to the right;
a second right shift register shifting output data of the second register one bit to the right;
a first XOR gate performing a bitwise XOR operation between the output data of the first register and the output data of the second register;
a third right shift register shifting output data of the first XOR gate one bit to the right;
a first multiplexer selecting any one of the plurality of first bits, the output data of the first register, output data of the first right shift register, and output data of the third right shift register, and providing the selected data as input data of the first register;
a second multiplexer selecting any one of the plurality of second bits, the output data of the second register, output data of the second right shift register, and the output data of the third right shift register, and providing the selected data as input data of the second register;
a first left shift register shifting output data of the third register one bit to the left;

a second left shift register shifting output data of the fourth register one bit to the left;

a second XOR gate performing a bitwise XOR operation between the output data of the third register and the output data of the fourth register;

a third XOR gate performing a bitwise XOR operation between the output data of the third register and the plurality of second bits;

a fourth XOR gate performing a bitwise XOR operation between the output data of the fourth register and the plurality of second bits;

a third left shift register shifting output data of the third XOR gate one bit to the left;

a fourth left shift register shifting output data of the fourth register one bit to the left;

a third multiplexer selecting any one of the output data of the third register, output data of the first left shift register, output data of the second XOR gate, and output data of the third left shift register, and providing the selected data as input data of the third register; and a fourth multiplexer selecting any one of the output data of the fourth register, output data of the second left shift register, the output data of the second XOR gate, and output data of the fourth left shift register, and providing the selected data as input data of the fourth register, wherein the output data of the third register corresponds to the plurality of third bits expressing the inverse element of the first element.

2. The inverse calculation circuit of claim 1, wherein the first random number is generated later than generation of the second random number.

3. The inverse calculation circuit of claim 1, wherein the first random number comprises 2 bits.

4. The inverse calculation circuit of claim 1, wherein the second random number is greater than 2n and less than 3n, where n is the degree of the finite field.

5. The inverse calculation circuit of claim 1, wherein when the plurality of first bits and the plurality of third bits comprise n bits, the plurality of second bits comprise (n+1) bits.

6. The inverse calculation circuit of claim 1 wherein the first random number prevents a differential power analysis (DPA) decryption attack, and wherein the second random number prevents a timing decryption attack.

7. An inverse calculation method used for elliptic curve cryptography, the method comprising:

providing a random number generator that generates a first random number and a second random number; and providing an inverter that receives a plurality of first bits expressing a first element of a finite field as first inputs, wherein the first element is a (n−1)-degree polynomial, and receiving a plurality of second bits expressing a second element of the finite field as second inputs, wherein the second element is a n-degree polynomial, and in response to the first random number and the second random number, outputting a plurality of third bits expressing an inverse element of the first element, wherein the inverse element is a (n−1)-degree polynomial, wherein the inverter comprises:
a first register;
a second register;
a third register;
a fourth register;
a first right shift register shifting output data of the first register one bit to the right;

a second right shift register shifting output data of the second register one bit to the right;

a first XOR gate performing a bitwise XOR operation between the output data of the first register and the output data of the second register;

a third right shift register shifting output data of the first XOR gate one bit to the right;

a first multiplexer selecting any one of the plurality of first bits, the output data of the first register, output data of the first right shift register, and output data of the third right shift register, and providing the selected data as input data of the first register;

a second multiplexer selecting any one of the plurality of second bits, the output data of the second register, output data of the second right shift register, and the output data of the third right shift register, and providing the selected data as input data of the second register;

a first left shift register shifting output data of the third register one bit to the left;

a second left shift register shifting output data of the fourth register one bit to the left;

a second XOR gate performing a bitwise XOR operation between the output data of the third register and the output data of the fourth register;

a third XOR gate performing a bitwise XOR operation between the output data of the third register and the plurality of second bits;

a fourth XOR gate performing a bitwise XOR operation between the output data of the fourth register and the plurality of second bits;

a third left shift register shifting output data of the third XOR gate one bit to the left;

a fourth left shift register shifting output data of the fourth register one bit to the left;

a third multiplexer selecting any one of the output data of the third register, output data of the first left shift register, output data of the second XOR gate, and output data of the third left shift register, and providing the selected data as input data of the third register; and a fourth multiplexer selecting any one of the output data of the fourth register, output data of the second left shift register, the output data of the second XOR gate, and output data of the fourth left shift register, and providing the selected data as input data of the fourth register, wherein the output data of the third register corresponds to the plurality of third bits expressing the inverse element of the first element.

8. The method of claim 7 wherein the first random number prevents a differential power analysis (DPA) decryption attack, and wherein the second random number prevents a timing decryption attack.

9. A computer readable non-transitory storage medium having embodied thereon a computer program executed by a cryptography application circuit to perform an inverse calculation method used for elliptic curve cryptography, the method comprising:

generating a first random number and a second random number; and receiving a plurality of first bits expressing a first element of a finite field as first inputs, wherein the first element is a (n−1)-degree polynomial, and receiving a plurality of second bits expressing a second element of the finite field as second inputs, wherein the second element is a n-degree polynomial, and in response to the first random number and the second random number, outputting a plurality of third bits expressing an inverse element of the first element, wherein the inverse element is a (n−1)-degree polynomial, wherein the cryptography application circuit comprises:
a random number generator; and
an inverter,
wherein the inverter comprises:
a first register;
a second register;
a third register;
a fourth register;
a first right shift register shifting output data of the first register one bit to the right;
a second right shift register shifting output data of the second register one bit to the right;
a first XOR gate performing a bitwise XOR operation between the output data of the first register and the output data of the second register;
a third right shift register shifting output data of the first XOR gate one bit to the right;
a first multiplexer selecting any one of the plurality of first bits, the output data of the first register, output data of the first right shift register, and output data of the third right shift register, and providing the selected data as input data of the first register;
a second multiplexer selecting any one of the plurality of second bits, the output data of the second register, output data of the second right shift register, and the output data of the third right shift register, and providing the selected data as input data of the second register;
a first left shift register shifting output data of the third register one bit to the left;
a second left shift register shifting output data of the fourth register one bit to the left;
a second XOR gate performing a bitwise XOR operation between the output data of the third register and the output data of the fourth register;
a third XOR gate performing a bitwise XOR operation between the output data of the third register and the plurality of second bits;
a fourth XOR gate performing a bitwise XOR operation between the output data of the fourth register and the plurality of second bits;
a third left shift register shifting output data of the third XOR gate one bit to the left;
a fourth left shift register shifting output data of the fourth register one bit to the left;
a third multiplexer selecting any one of the output data of the third register, output data of the first left shift register, output data of the second XOR gate, and output data of the third left shift register, and providing the selected data as input data of the third register; and
a fourth multiplexer selecting any one of the output data of the fourth register, output data of the second left shift register, the output data of the second XOR gate, and output data of the fourth left shift register, and providing the selected data as input data of the fourth register, wherein the output data of the third register corresponds to the plurality of third bits expressing the inverse element of the first element.

10. The computer readable non-transitory storage medium of claim 9, wherein the first random number is generated at a time that is later than the time at which the second random number is generated.

11. The computer readable non-transitory storage medium of claim 9, wherein the first random number comprises 2 bits.

12. The computer readable non-transitory storage medium of claim 9, wherein the second random number is greater than 2n and less than 3n, where n is the degree of the finite field.

13. The computer readable non-transitory storage medium of claim 9, wherein when the plurality of first bits and the plurality of third bits comprise n bits, the plurality of second bits comprise (n+1) bits.

14. The computer readable non-transitory storage medium of claim 9 wherein the first random number prevents a differential power analysis (DPA) decryption attack, and wherein the second random number prevents a timing decryption attack.

15. The inverse calculation circuit of claim 1, wherein the inverter further comprises:
a fifth register storing a degree of the finite field;
an AND circuit performing a bitwise AND operation between the output data of the first register and output data of a fifth register; and
a control logic unit generating a plurality of control signals to control the first through fourth multiplexers and the first through fourth registers based on the first random number, the second random number, a least significant bit (LSB) of the output data of the first register, an LSB of the output data of the second register, a most significant bit (MSB) of the output data of the third register, and an output signal of the AND circuit.

* * * * *